United States Patent
Moeller (12)

(10) Patent No.: US 11,339,033 B2
(45) Date of Patent: May 24, 2022

(54) WIND TURBINE LIFTING ARRANGEMENT

(71) Applicant: Siemens Gamesa Renewable Energy A/S, Brande (DK)

(72) Inventor: Jesper Moeller, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 188 days.

(21) Appl. No.: 16/615,142

(22) PCT Filed: May 28, 2018

(86) PCT No.: PCT/EP2018/063946
§ 371 (c)(1),
(2) Date: Nov. 20, 2019

(87) PCT Pub. No.: WO2018/228810
PCT Pub. Date: Dec. 20, 2018

(65) Prior Publication Data
US 2021/0284506 A1    Sep. 16, 2021

(30) Foreign Application Priority Data

Jun. 12, 2017    (DE) .................... 10 2017 209 873.2

(51) Int. Cl.
*B66C 13/00*    (2006.01)
*B66C 13/08*    (2006.01)
(Continued)

(52) U.S. Cl.
CPC ............ *B66C 13/085* (2013.01); *B66C 1/108* (2013.01); *B66C 13/105* (2013.01);
(Continued)

(58) Field of Classification Search
CPC ... B66C 13/063; B66C 13/085; B66C 13/105; B66C 23/185; B66C 1/108; F03D 13/10; F03D 13/25; F05B 2230/61
See application file for complete search history.

(56) References Cited

U.S. PATENT DOCUMENTS

2010/0230370 A1\* 9/2010 Schneider ............... B66C 23/52
212/276
2015/0158704 A1\* 6/2015 Giles ....................... B66C 23/52
212/273
(Continued)

FOREIGN PATENT DOCUMENTS

| CN | 105201755 A | 12/2015 |
|---|---|---|
| CN | 106573764 A | 4/2017 |

(Continued)

OTHER PUBLICATIONS

International Search Report and Written Opinion of the International Searching Authority dated Oct. 4, 2018 for Application No. PCT/EP2018/063946.

*Primary Examiner* — Emmanuel M Marcelo
(74) *Attorney, Agent, or Firm* — Schmeiser, Olsen & Watts LLP

(57) ABSTRACT

Provided is a lifting arrangement configured to facilitate alignment of a load with a wind turbine assembly. The lifting arrangement includes a crane arrangement for hoisting the load to the wind turbine assembly, a tagline arrangement for stabilizing the load during a lifting manoeuvre, a sensor arrangement configured to detect a motion of the wind turbine assembly relative to the load during the lifting manoeuvre, an actuator arrangement for adjusting the position of the load relative to the wind turbine assembly, and a control arrangement for controlling actuators of the actuator
(Continued)

arrangement to reduce the detected relative motion. Also provided is a method of aligning a load with a wind turbine assembly.

14 Claims, 5 Drawing Sheets

(51) Int. Cl.
*F03D 13/10* (2016.01)
*B66C 1/10* (2006.01)
*B66C 13/10* (2006.01)
*B66C 23/18* (2006.01)

(52) U.S. Cl.
CPC ............ *B66C 23/185* (2013.01); *F03D 13/10* (2016.05); *B66C 2700/08* (2013.01); *F05B 2230/61* (2013.01)

(56) References Cited

U.S. PATENT DOCUMENTS

| | | | |
|---|---|---|---|
| 2016/0200553 A1 | 7/2016 | Sørensen et al. | |
| 2016/0229671 A1 | 8/2016 | Herse et al. | |
| 2017/0050824 A1* | 2/2017 | Fenger | B66C 23/185 |
| 2017/0233228 A1* | 8/2017 | Coners | B66C 13/44 |
| | | | 29/889.21 |
| 2020/0017337 A1* | 1/2020 | Van Loon | B66C 13/06 |
| 2020/0299108 A1* | 9/2020 | Van Veluw | B66C 13/08 |

FOREIGN PATENT DOCUMENTS

| | | |
|---|---|---|
| DE | 102014003906 A1 | 1/2015 |
| EP | 2189574 A1 | 5/2010 |
| EP | 2889251 A1 | 7/2015 |
| KR | 20140000965 A | 1/2014 |
| WO | 2015165463 A1 | 11/2015 |
| WO | WO2015165463 A1 | 11/2015 |

\* cited by examiner

WIND TURBINE LIFTING ARRANGEMENT

CROSS-REFERENCE TO RELATED APPLICATIONS

This application claims priority to PCT Application No. PCT/EP2018/063946, having a filing date of May 28, 2018, which is based on German Application No. 10 2017 209 873.2, having a filing date of Jun. 12, 2017, the entire contents both of which are hereby incorporated by reference.

FIELD OF TECHNOLOGY

The following describes a lifting arrangement for facilitating alignment of a load with a wind turbine assembly and a method of aligning a load with a wind turbine assembly.

BACKGROUND

During a wind turbine installation, different components of a wind turbine (tower sections, nacelle, hub, blades, generator unit, etc.) can be lifted to the partially installed wind turbine by a crane. Some types of load, e.g. rotor blade, require precise alignment with a target in order to be connected to the partially installed wind turbine. The "target" can be understood to be a specific interface on the wind turbine assembly, e.g. a yaw ring is the target for the nacelle; a pitch ring is the target for a rotor blade; etc. However, aligning the load with its target can be difficult. A problem with the known types of lifting arrangement is the relative motion between the load and the wind turbine assembly, which makes the process of alignment of the load with the target lengthy and tedious, and which can restrict the wind turbine installation procedure to favourable weather conditions.

A load-lifting manoeuvre is especially challenging in the case of an offshore wind turbine. An offshore wind turbine installed in a water depth of around 30 m is typically larger in size compared to a land wind turbine and can have a tower height in the region of 60-80 m or even more. When the offshore wind turbine is supported by a monopile, wave action and water current result in significant tower oscillations. Such an offshore wind turbine can oscillate with an amplitude of around 200 mm in normal conditions, and the amplitude can exceed 1 metre in extreme conditions.

The wind turbine tower can also be made to oscillate by the wind. In addition, the suspended load is also affected by the wind and can move erratically. It is especially challenging to align components which require precise position matching with its target on the wind turbine assembly—for example the root end of a suspended rotor blade to a pitch ring on the spinner or hub. For these reasons, alignment and attachment of the load to the target on a wind turbine assembly is a lengthy and time-consuming process. The procedure can also pose a risk to workers in unfavourable conditions. Therefore, whenever the tower oscillations are too severe to permit load alignment, the installation process is interrupted, resulting in downtime and added costs.

It is known to use taglines to stabilize a suspended load and to reduce free swinging of the load, even in unfavourable wind conditions. However, in wind turbine installations the main problem is that the wind turbine tower can oscillate significantly, making it difficult to align a load with its target. One way of reducing the oscillations of a wind turbine assembly might be to arrange water-filled tanks as liquid dampers in an upper region of the tower. However, this approach is costly and cannot completely eliminate the oscillations of the wind turbine tower, so that alignment of load and target remains problematic. It is expected that this problem will become greater in the coming years as wind turbines increase in height, and as offshore wind turbines are located in deeper waters.

SUMMARY

An aspect relates to an improved way of hoisting a load to a wind turbine assembly.

According to embodiments of the invention, the lifting arrangement is realized to facilitate alignment of a load with a wind turbine assembly and comprises a crane arrangement for hoisting the load to the wind turbine assembly; a tagline arrangement for stabilizing the load during a lifting manoeuvre; a sensor arrangement realized to detect a motion of the wind turbine assembly relative to the load during the lifting manoeuvre; an actuator arrangement for adjusting the position of the load relative to the wind turbine assembly; and a control arrangement for controlling actuators of the actuator arrangement to reduce the detected relative motion.

In the context of embodiments of the invention, the load may be understood to be any wind turbine component such as a tower, a tower section, a nacelle, a generator, a hub, a rotor blade, etc. The lifting assembly can hoist such a heavy and cumbersome wind turbine component into place during a wind turbine installation procedure or during a maintenance procedure. The lifting assembly can comprise any suitable crane, for example a crane with a boom, jib, and a traverse/guidewire arrangement. The tagline arrangement can also be part of the crane. The elements of the inventive lifting arrangement that can be controlled by the controller can be any one or more of a winch, a hydraulic cylinder, etc.

The inventive lifting arrangement allows an advantageously precise and controlled alignment of a heavy load to a target, even if the wind turbine assembly (and therefore the target) is exhibiting significant oscillation. For example, from the point of view of a horizontally suspended rotor blade, its target—one of the pitch rings on the hub—will appear to move from side to side. The sensor arrangement allows any relative motion between the load and the target to be determined, and the control arrangement can respond to control actuators that synchronize the motion of the load to the motion of the target. Using the example of the horizontally suspended rotor blade again, embodiments of the invention deliberately causes the suspended load to move so that its motion mimics the motion of the target. From the point of view of the horizontally suspended rotor blade, its target will therefore appear to be stationary, when in fact the wind turbine assembly as well as the load may both exhibit significant oscillations. In this way, the load hoisting manoeuvre can be carried out faster, thus saving costs. Any such hoisting manoeuvre is also safer.

Equally, the inventive lifting arrangement can be used when such a wind turbine component is to be detached from a wind turbine assembly for replacement or maintenance and can greatly simplify the procedure by controlling elements of the lifting assembly on the basis of the sensed wind turbine motion.

The inventive lifting arrangement can also be used to install wind turbines in relatively deep water, in which the jackup legs of currently used installation vessels would have to be over-extended. A jackup vessel (also referred to as a "stationary" installation vessel) is generally equipped with legs that have a certain length for use in a maximum rated water depth. Usually, three or more such legs are provided, each with the same fixed length, and these can be extended downward through the deck of the jackup vessel to reach and penetrate the seabed, while the deck "climbs" the jackup legs to remain above the water level. Jackup vessels used in the installation of present offshore wind parks can generally be used in a water depth of 20-40 m. The effect of the water current and wave action on the oscillations of the jackup vessel can be neglected if the jackup legs are not extended to their full, that is when the jackup vessel is used in relatively shallow water (30-40 m). Within the rated depth of the jackup vessel, the buffeting wave action has a similar effect on the wind turbine and on the jackup vessel, so that both structures move in a well-defined fashion. However, over-extending the jackup vessel legs beyond their rated depth will result in significant instabilities of the installation vessel. It is to be expected that, in the future, wind turbine parks will be installed further off shore in deeper water (50 m or more). In addition to the buffeting wave action against the over-extended jackup vessel legs, the movements of the crane will amplify the movements of the unstable jackup vessel. With the inventive lifting assembly, any such movements, even erratic movements, can be compensated so that the load motion can be synchronized with the target motion. It will therefore be possible to use a jackup vessel with the usual leg length even in water depths that exceed its rated depth. This can avoid any costs associated in procuring a jackup vessel with longer legs for a greater water depth.

According to embodiments of the invention, the method of aligning a load with a wind turbine assembly comprises the steps of providing a crane arrangement for hoisting the load to the wind turbine assembly; providing a tagline arrangement for stabilizing the load during a lifting manoeuvre; providing a sensor arrangement realized to detect a motion of the wind turbine assembly relative to the load during the lifting manoeuvre; providing an actuator arrangement for adjusting the position of the load relative to the wind turbine assembly; and controlling actuators of the actuator arrangement to reduce the detected relative motion.

An advantage of the inventive method is that the duration of a component lifting manoeuvre can be significantly reduced since the inventive method is independent of the wind turbine oscillations. Any motion of the wind turbine assembly can be detected by the sensor arrangement and taken into account by the controller, which controls actuators of the actuator arrangement to adjust the position of the suspended load relative to the wind turbine assembly as required. The lifting manoeuvre can also proceed under stronger winds and/or currents resulting in less installation downtime due to unfavourable weather conditions. The inventive method is not only faster than the known procedures, it is also significantly safer, since the motion of the load relative to the motion of the wind turbine assembly is reduced, and may even be eliminated, even in unfavourable conditions.

According to embodiments of the invention, a computer program product (non-transitory computer readable storage medium having instructions, which when executed by a processor, perform actions) comprises a computer program that is directly loadable into a memory of a control unit of an inventive lifting arrangement and which comprises program elements for performing steps of the inventive method when the computer program is executed by the control unit of the lifting arrangement.

The controller of the inventive lifting arrangement is therefore able to respond essentially immediately to any relative motion of the wind turbine assembly and load, and to adjust the position of the suspended load accordingly. In this way, the load can advantageously always be moved in a very precisely controlled manner relative to the wind turbine assembly.

Particularly advantageous embodiments and features of the invention are given by the dependent claims, as revealed in the following description. Features of different claim categories may be combined as appropriate to give further embodiments not described herein.

In the following, but without restricting embodiments of the invention in any way, the wind turbine may be assumed to be an offshore wind turbine. The wind turbine may be assumed to be mounted on a monopile support structure. As explained above, oscillations of such a monopile wind turbine assembly are predominantly an effect of the buffeting push/pull action of the seawater on the monopile.

While the inventive lifting arrangement is described herein in the context of a monopile offshore wind turbine installation, assembled using a crane of an installation vessel (i.e. a jackup vessel), it will be understood that the inventive concept can be used during the installation or maintenance of any similar structure that exhibits oscillations.

As explained above, the jackup vessel uses jackup legs that penetrate the seabed in order to stabilize the vessel deck, which is the working platform from which to assemble the wind turbine. In such water depths, the jackup legs of currently available jackup vessels must be "over-extended", resulting in greater instability of the installation vessel. The height of an offshore wind turbine is also expected to increase in the future (heights of 140 m or more are expected), resulting in even larger oscillations amplitude at the upper level and at the same time requiring a taller crane to reach to the top, which adds to the overall instability. It would be therefore nearly impossible to install a very tall wind turbine in a water depth that is deeper than the rated depth of the jackup vessel. The inventive method should be applied to synchronize the movements of the load to the movements of the wind turbine and hence facilitate and speed up the hoisting procedure.

The tagline arrangement is provided as part of the crane arrangement and serves to stabilize the load during a lifting manoeuvre. A crane that uses one or more traverse structures may also comprise a guidewire arrangement to carry a pair of snatch blocks for the taglines. A tagline can be anchored between a bottom traverse and a top traverse, for example, and can pass through a snatch block that acts to divert the tagline to the load. Taglines are generally used to stabilize a load during a lifting manoeuvre, particularly when the crane has a relatively long outreach, and to ensure that the load will not oscillate excessively. At the same time, the taglines can also be used to move the load horizontally by increasing and reducing the tension of the taglines. Therefore, in a preferred embodiment of the invention, the actuator is realized to control a guidewire winch and/or a tagline winch as required to synchronize the motion of the load to the target. One or more sensors from the sensor arrangement send data to the control arrangement, where the data is interpreted and translated into parameters that describe the oscillation of the target on the wind turbine assembly. It may be assumed that the movement of the target can be described as a one-dimensional oscillation. In this case relevant parameters are the amplitude and velocity of the target. After those parameters are obtained, the control arrangement generates control signals for actuators to move the load so that the relative motion between the load and the target is reduced. This process can be repeated, for example in an iterative manner, until the load and the target move essentially synchronously.

These are various ways in which a sensor arrangement can be configured to obtain data that can quantify the relative motion between the load and the target. In a preferred embodiment of the invention, at least one sensor is placed on the wind turbine assembly, high up on the wind turbine assembly, to detect the movement of the wind turbine. For example, a sensor such as an accelerometer can be positioned inside the nacelle. An accelerometer is an electromechanical device that measures acceleration. The measured acceleration can be integrated to obtain velocity and position. The inventive lifting arrangement can use a dedicated accelerometer or similar sensor to measure the oscillations of the wind turbine assembly. Data collected from such a sensor may be sufficient to allow the control unit to determine the necessary corrective action in order to achieve synchronization of the load to the target. Alternatively, since it is already standard practice to install a number of such sensors to measure oscillations of the wind turbine for the purpose of stability analysis, the inventive lifting arrangement could use an existing sensor arrangement to measure the oscillations of the wind turbine assembly.

As explained above, the jackup vessel may oscillate significantly when positioned in deep water with over-extended jackup legs. With increasing height of wind turbines, a taller crane is required to reach higher. Both factors result in increased instability of the lifting assembly and correspondingly increased oscillations of the suspended load. In a particularly preferred embodiment of the invention, a further sensor (for example an accelerometer) can be positioned on the lifting assembly, e.g. on a lifting tool that holds the suspended load. Such a sensor can detect oscillations of the load arising from jackup vessel motion as well as from the wind. A sensor positioned on the load can also be used for obtaining feedback of the actual motion of the load during the process of aligning the load motion to the motion of the wind turbine. In this way synchronization of the load motion to the target motion can be effectively and precisely achieved.

A number of sensors can also be installed on the installation vessel, for example any kind of laser sensor directed at a point on the wind turbine and/or the load to measure amplitude and frequency of the wind turbine assembly's oscillation. Such a sensor, mounted on the installation vessel and directed towards the wind turbine, would directly measure a wind turbine motion relative to the installation vessel. A camera detecting the movements of the markers on the wind turbine, a kind of motion capture sensor, could also be used.

One advantage of a laser sensor is the possibility to place it on the installation vessel, so that the same sensor can stay fixed at the installation vessel and be used for the installation of an entire wind park, keeping the cost of the sensor arrangement to a favourable minimum. A laser sensor is also contact-free and can be directed at any suitable surface of the wind turbine. One type of laser sensor that may be used is a laser Doppler vibrometer (LDV). A laser beam from the LDV can be directed at a surface on the wind turbine with no need of special markers on the surface. The oscillation amplitude and frequency of the wind turbine relative to the installation vessel can be determined to a high degree of accuracy using the Doppler shift of the reflected laser beam.

Data from the sensors detecting the motion of the target are collected in the control arrangement. From that data, the oscillation parameters can be extracted. The amplitude of the oscillation can then be determined. This information can be used to setup the crane prior to a lifting manoeuvre: in a preferred embodiment of the invention, the crane may be set up so that initially the load is suspended through a point corresponding to the maximal outward deviation of the target. This allows relatively easy and efficient synchronisation of the motion of the load to the target, which follows this initial positioning step as explained in the following.

The direction in which the monopile wind turbine assembly will oscillate during the installation procedure is the same as the water current direction and can be determined immediately prior to the installation procedure. It is observed that direction of the water current remains essentially constant within a period of 24 hours, which can be sufficient for a wind turbine to be assembled. Therefore, in a preferred embodiment of the invention, the installation vessel is positioned downstream (or upstream) of the wind turbine to be assembled, to ensure that the wind turbine oscillates towards and away from the installation vessel, simplifying the process of synchronization of the load to the target.

It is assumed that the installation vessel is positioned downstream of the wind turbine assembly and that the initial position is set to the maximum outward deviation of the target as explained above. At this point, the tension in the taglines is negligible. From the point of view of the load, its target is oscillating to and fro. The desired movement of the load can be achieved solely by adjusting the winches of the taglines to pull the load from its initial position (maximum outward deviation) towards the maximum inward deviation by increasing tension of the taglines, and vice versa to allow the load to move back outwards towards the maximum outward deviation. The oscillation of the load can therefore mimic or follow the oscillation of its target on the wind turbine by controlling the tagline tension within these two extremes.

Another possible way of moving to load to mimic the movement of its target in a controlled manner may be to use a lifting tool with an incorporated trolley to allow motion of the load in that lateral direction.

A load such as a rotor blade can be affected by the wind during the lifting manoeuvre. Uplift experienced by a very long rotor blade—for example with a length of 80 m or more—can make it difficult to precisely manoeuvre the horizontal blade into place for connecting to a pitch ring on the hub. Therefore, in a preferred embodiment of the invention, the lifting tool can comprise two or more actuators to effect an angular displacement of the load to counteract any uplift experienced by the suspended load during the lifting manoeuvre. For example, such actuators can be part of a lifting yoke, and can be realised as a number of hydraulic cylinders. In this way, the yoke of a lifting tool can be controlled to alter the angle of the suspended load about one or two horizontal axes.

BRIEF DESCRIPTION

Some of the embodiments will be described in detail, with references to the following Figures, wherein like designations denote like members, wherein.

DETAILED DESCRIPTION

Figure 1:
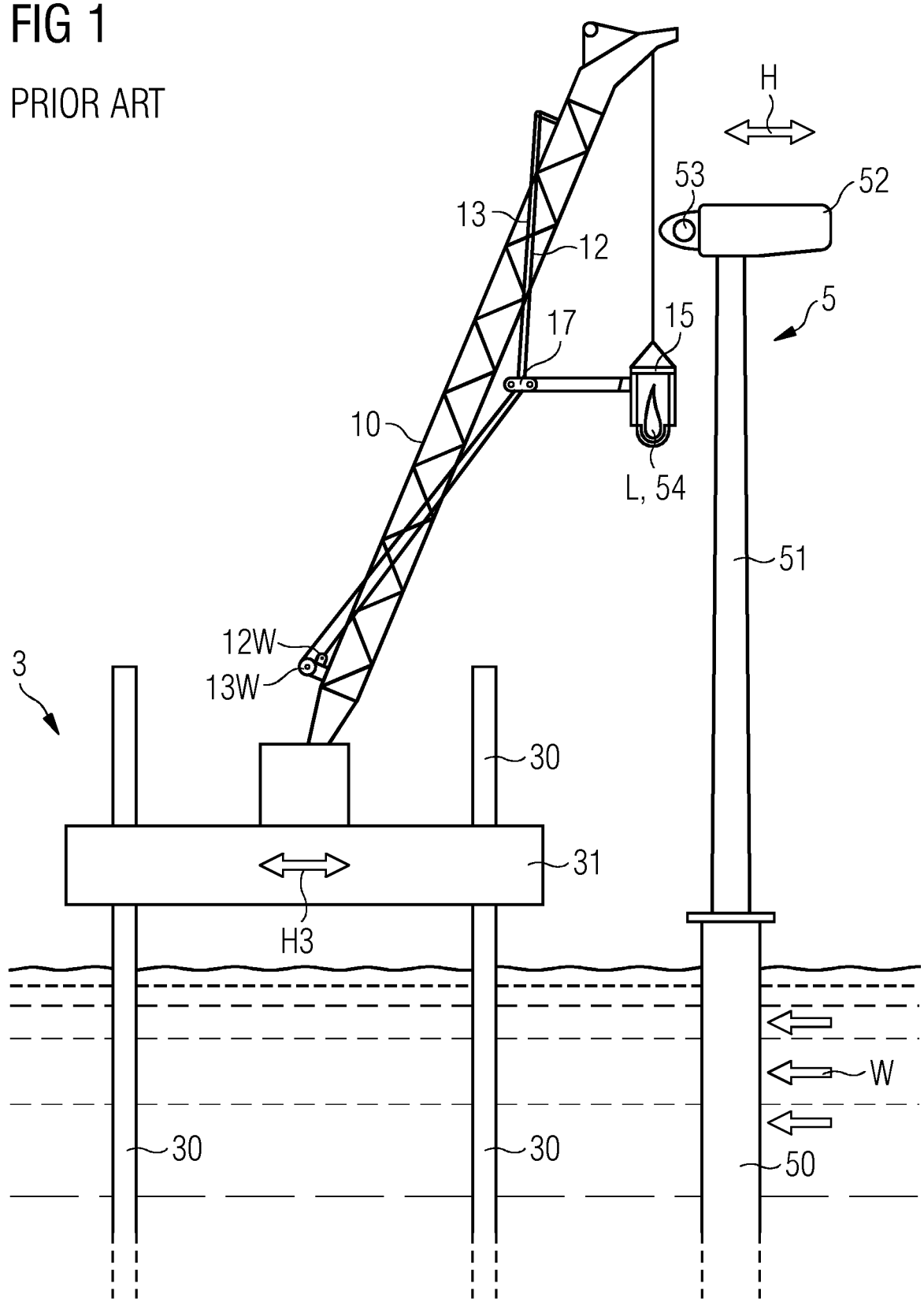
FIG. 1 shows a conventional lifting arrangement during the installation of an offshore wind turbine.

FIG. 1 shows elements of a known art lifting arrangement during the installation of an offshore wind turbine 5. The diagram shows the offshore wind turbine 5 assembled on top of a supporting structure 50—a concrete monopile in this case. The tower 51, nacelle 52 and hub 53 have already been assembled, and a load L—in this case a rotor blade 54—is being hoisted towards a target. Here, the target is the hub 53, and the rotor blade 54 is to be connected to a blade pitch ring. Wave action W on the supporting structure 50 and/or wind loading on the tower 51 and nacelle 52 can result in a periodic lateral displacement H of the wind turbine 5.

The diagram also shows an installation vessel 3, which is stabilised by jackup legs 30 penetrating the seabed. A crane 10 comprising a boom, a jib, a lifting tool 15 and a tagline arrangement 12 is installed on the deck 31 of the jackup vessel 3. Usually there are at least two tagline arrangements 12 installed on the crane 10, in conjunction with a guidewire arrangement to carry a pair of snatch blocks 17 for the taglines 12. A tagline 12 can be anchored between a bottom traverse and a top traverse, for example, and can pass through a snatch block 17 that acts to divert the tagline 12 to the load L. The taglines 12 are realized to stabilize the suspended load L during lifting manoeuvre so that it cannot swing freely. In the known art, only partial suppression of the movements of the load L is possible, since it is still exposed to wind buffeting (especially when the load L is long and has a large area in the case of a rotor blade 54). Furthermore, oscillations of the crane as a consequence of insufficient stability of the installation vessel 3, for example if the jackup vessel 3 is unstable due to over-extension of the jackup legs 30 in deep water, insufficient penetration depth etc., are transferred to the load L. Additional oscillation of the lifting tool may arise when the crane must be extended to great heights, as is to be expected in the future with ever increasing height of the wind turbines (up to 140 m or even more).

Therefore, during the hoisting process of the load L to the target 5, the load and the target are each moving with a different amplitude and velocity, making it difficult or even impossible to align the load L with its target. These problems will become worse in the future as wind turbines increase in height, and as water depth at wind park installation sites increases.

Figure 2:
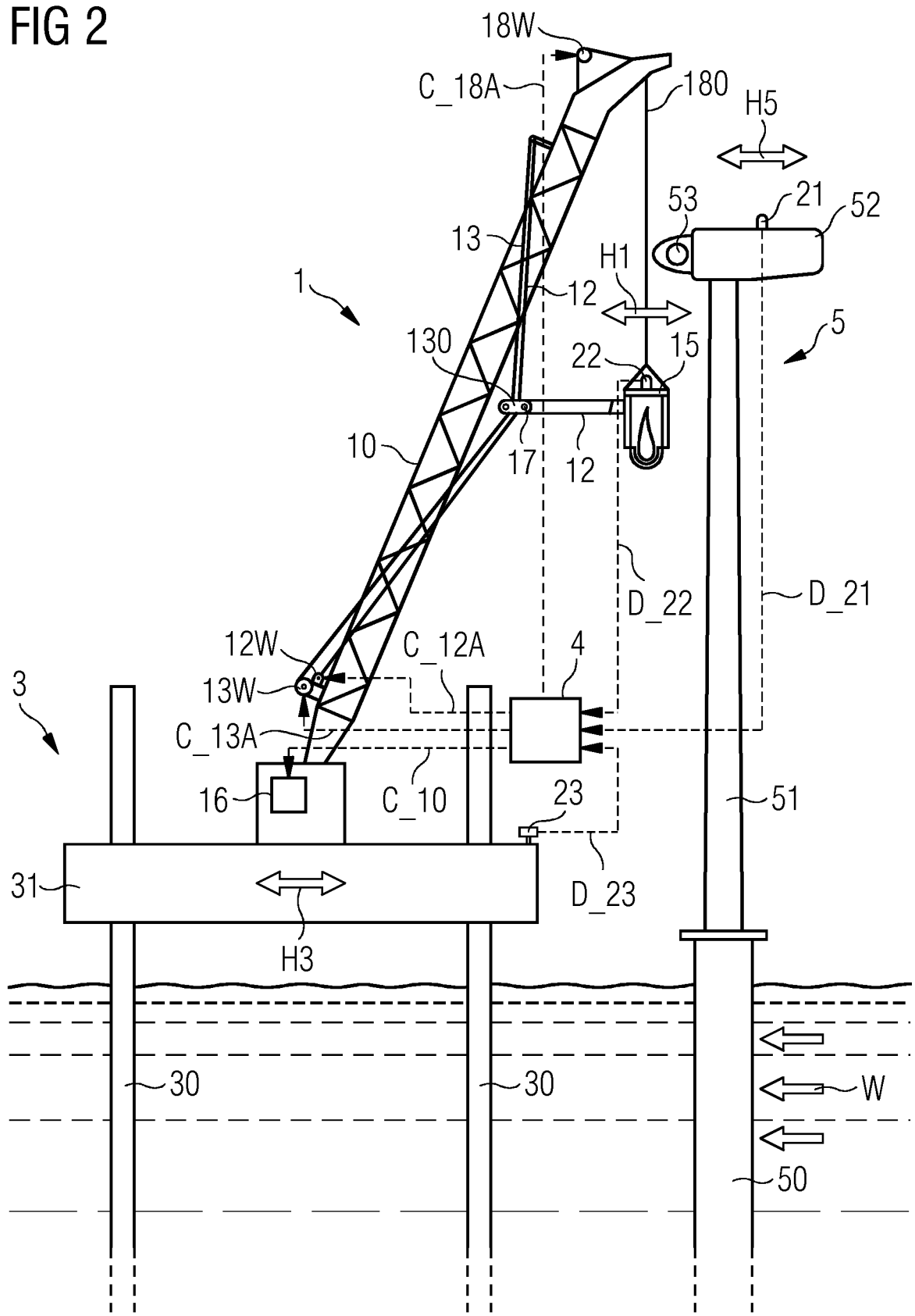
FIG. 2 shows an embodiment of a lifting arrangement during an installation of an offshore wind turbine.

The inventive lifting arrangement can overcome these problems. FIG. 2 shows elements of the inventive lifting arrangement 1 during the installation of an offshore wind turbine 5. As already described with the aid of FIG. 1, the wind turbine components 51, 52, 53, 54 are to be assembled at a deep water installation site to install the wind turbine 5. In this case, the crane 10 of the lifting assembly 1 comprises a boom and a jib with sufficient length to extend beyond the height of an assembled wind turbine 5 with a tower height in the region of 140 m. The crane 10 is mounted on the installation vessel 3 (with the over extended jackup legs 30) in a water depths around 50 m. A sensor arrangement has been provided, and the diagram shows various possible locations for a sensor 21, 22, 23. The sensor arrangement can comprise an accelerometer sensor 21 attached on the nacelle 52 and/or an accelerometer 22 on the lifting tool and/or a laser sensor 23 fixed on a deck of the installation vessel 3. The sensors are used to detect and quantify movements H5, H1 of the target 5 and of the load L. For the detection of the oscillatory motion of the target 5 and of the load L, the accelerometer sensors 21 and 22 could provide enough information. A non-contact sensor such as a laser velocimeter 23 can be used alone or in addition to accelerometer sensors 21, 22 to provide more accurate estimates. A control unit 4 is provided which receives data D_21, D_22, D_23 from the sensors 21, 22, 23 and analyses the data to determine the oscillatory motions H5, H1 of the target (position and velocity) and that of the load (position and velocity). The control unit 4 is informed of the crane position, load weight, load height etc. With this information, the control unit 4 can compute a correction required to synchronize a motion H1 of the load L with the motion H5 of the target 5, and generates appropriate control signals C_12A, C_13A, C_10, C_18A for any relevant actuator such as a winch motor of a tagline 12, a winch motor of a guidewire 13 of a lifting tool 15, a crane controller 16, a winch motor 18W of the hook cable 180, etc. The inventive lifting arrangement is to be understood to comprise at least the crane arrangement with its taglines etc., the sensor arrangement and the control arrangement.

Corrections can be made continually, at regular intervals, intermittently, etc. in order to hoist the load L into place at the target. For example, the load L may be hoisted partway to the target 5 without considering any synchronization of load and target. Instead, the corrective signals computed by the control unit may be applied shortly before the load is to "dock" with its target. The control unit 4 may be realised in a computer, a handheld device, etc.

Figure 3:
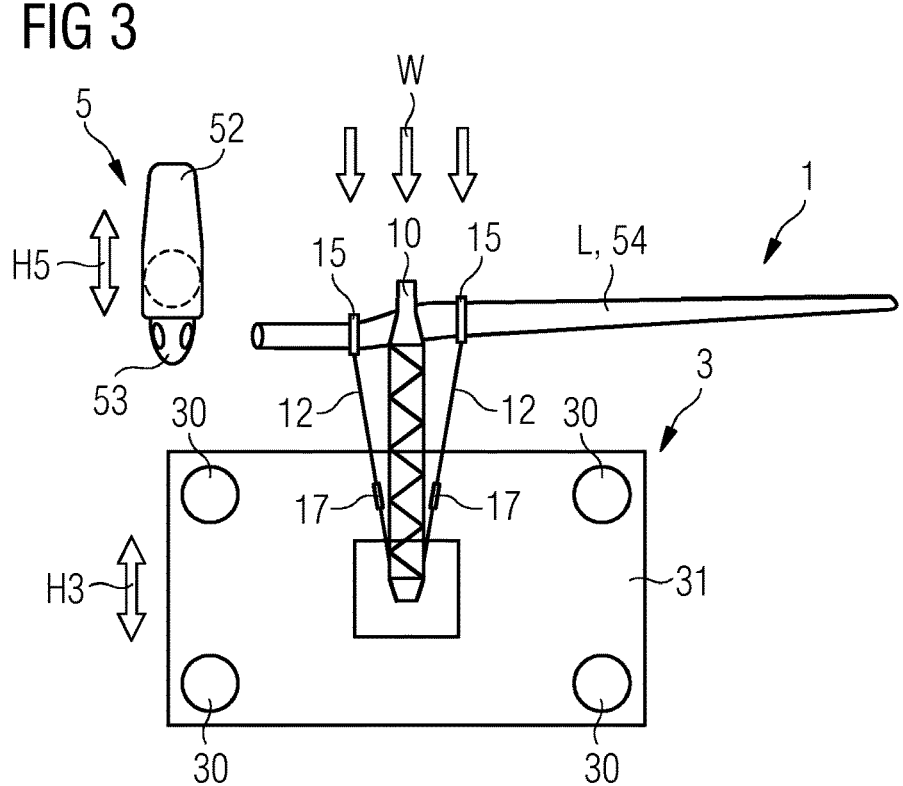
FIG. 3 shows a plan view of an embodiment of the lifting arrangement during the installation of an offshore wind turbine.

FIG. 3 shows a plan view of the inventive lifting assembly 1 relative to a wind turbine assembly 5. The nacelle 52 and the hub 53 of the wind turbine assembly 5 are seen from above. The tower is caused to oscillate in a lateral direction H5 as indicated by the arrow. Similarly, the crane assembly is shown from above with oscillations H3 of the jackup vessel 3. The crane 10 is holding a rotor blade L, 54 to be connected to a pitch ring on the hub 53. The blade 54 is horizontally held by the lifting tool 15 and stabilized by two taglines 12, each comprising a snatch block 17 that directs the tagline 12 to the load L, 54. The deck 31 of the installation vessel 3 is seen from above. The wind turbine 5 oscillates with displacement H5 towards and away from the installation vessel 3. On the basis of the signals from the sensors described in FIG. 2 above, which detect the motion H5 of the hub, the control unit 4 generates appropriate control signals for the winch motors of the taglines 12, which increase and decrease the tension of the taglines 12 as appropriate to bring the blade 54 into synchronous movement with the hub 53.

Figure 4:
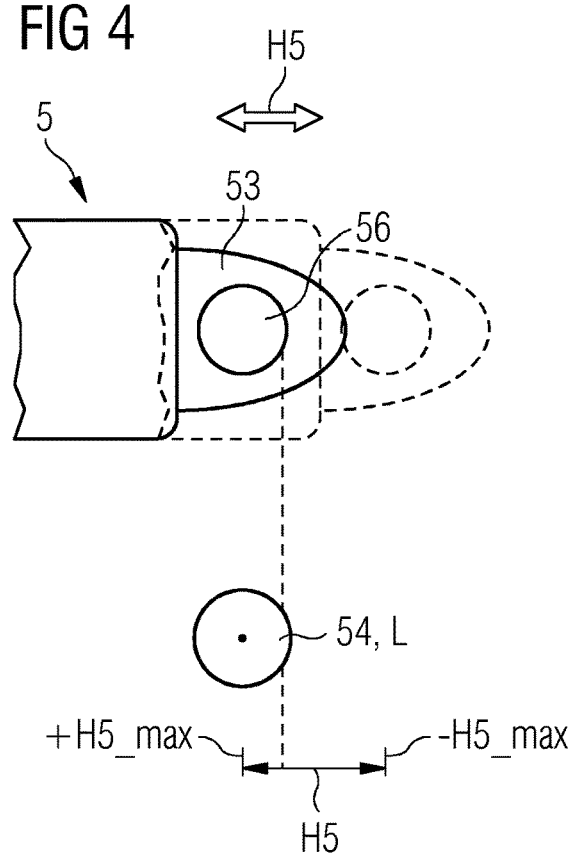
FIG. 4 shows an initial position of the load in an embodiment of the lifting arrangement.

FIG. 4 shows an initial position of the load L, in this case a rotor blade 54, relative to an oscillating target, in this case a pitch ring 56 on the hub 53, before the synchronization of the load is started. The crane is set up so that the load L, 54 is initially suspended through the maximum outward displacement +H5_max of the target. Horizontal motion of the load L can therefore be controlled using the taglines over the entire range +H5_max to −H5_max. It ensures a controlled movement of the load L, 54 once its synchronization to the target 56 is started, owing to the fact that by pulling and releasing the taglines, the load L, 54 can move within the range defined by the two maxima, i.e. from a state with minimal tension of the taglines (initial position +H5_max) to the state with the maximal tension of the taglines −H5_max (furthest away from its initial position) and back, mimicking the oscillation H5 of the target 56.

Figure 5:
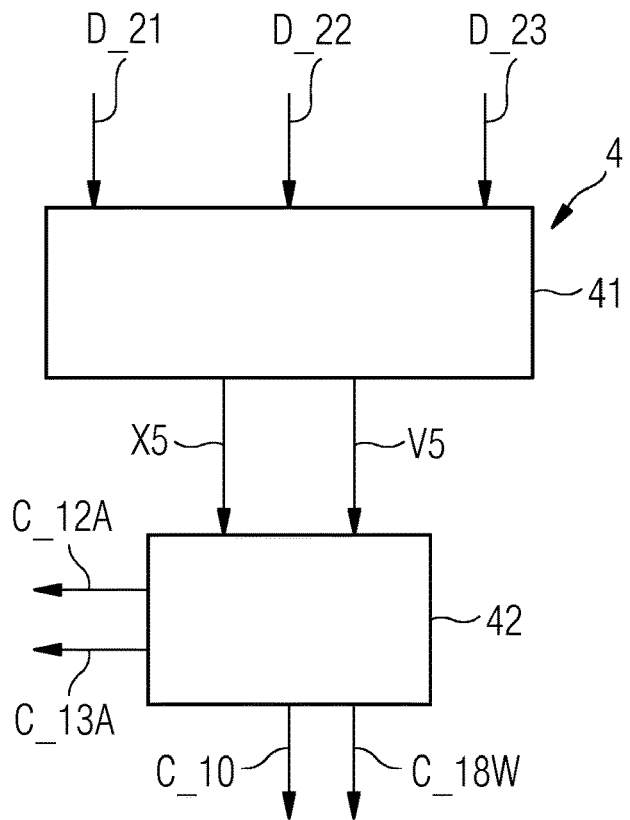
FIG. 5 shows a block diagram of a controller of an embodiment of the lifting arrangement.

FIG. 5 shows a simplified block diagram of the controller 4. The controller 4 is setup to receive data D_21, D_22, D_23 from the sensors of the sensor arrangement, for example frequency mismatch from a laser Doppler vibrometer 23, and/or acceleration values from one or more accelerometers 21 and 22, etc. With this information, an analysis unit 41 determines any oscillatory motion of the target relative to the load. For example, the analysis unit 41 can determine the amplitude X5 and frequency V5 of the target and the direction of its oscillations. From the computed amplitude, frequency and direction of the target oscillation, a computation module 42 computes a corrective control signal C_12A for a tagline winch 12A, a corrective control signal C_13A for a guidewire winch 13A, and a corrective control signal C_10 for a crane motor to adjust the angle of the crane boom, etc.

Figure 6:
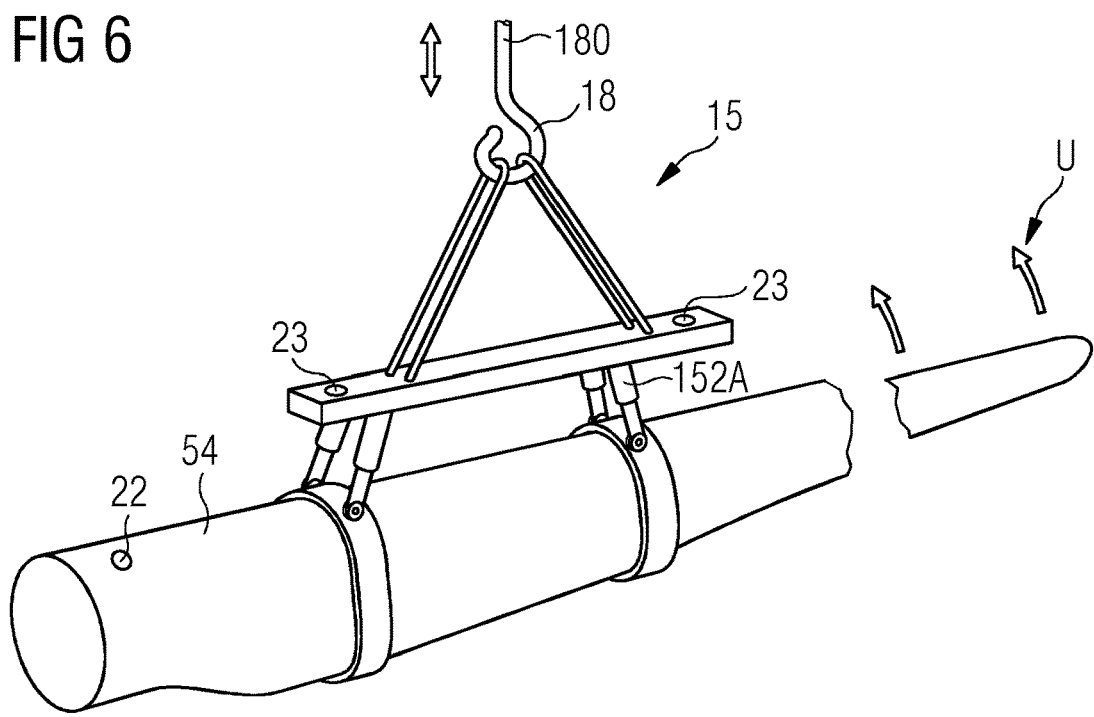
FIG. 6 shows a lifting tool of an embodiment of the lifting arrangement.

The blade 54 can experience an uplift caused by the wind. To counteract this, the lifting tool 15 can comprise actuators to adjust the orientation of the load L. Such actuators can be realised as a number of hydraulic cylinders installed on the lifting yoke, for example laterally extendable actuators 152A as illustrated in FIG. 6, which shows a simplified lifting tool 15, in this case a lifting tool 15 that is adapted to hold a rotor blade 54 while this is being raised to a blade pitch ring 56 of a previously installed hub on a partially assembled wind turbine 5. The lifting tool 15 has a gripping assembly 152 for holding the rotor blade 54, with a number of laterally extendable actuators 152A, in this case a lateral arrangement of hydraulic cylinders 152A.

The drawing also shows a number of sensors 23 arranged to report a change in orientation of the rotor blade 54. For example, uplift U because of wind can cause the tip end of the blade 54 to push upward, thereby tilting the entire blade 54. The sensors 23—for example accelerometers—can report any change in position to the controller 4, which detects the extent of uplift, and generates control signals for actuators 152A to react accordingly in order to keep the rotor blade 54 steady.

Figure 7A:
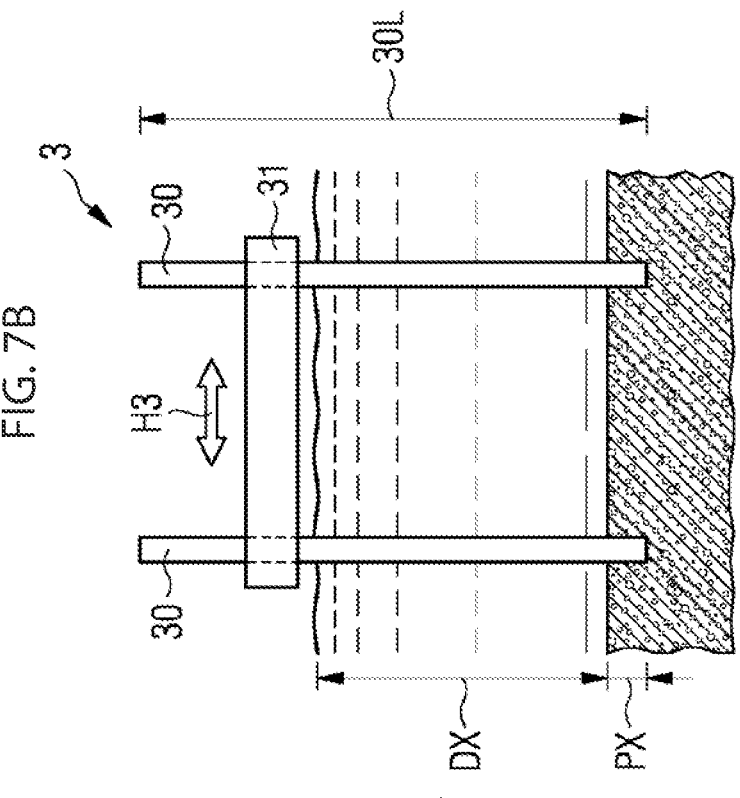
FIG. 7A shows a jackup vessel as used in a conventional installation procedure.
Figure 7B:
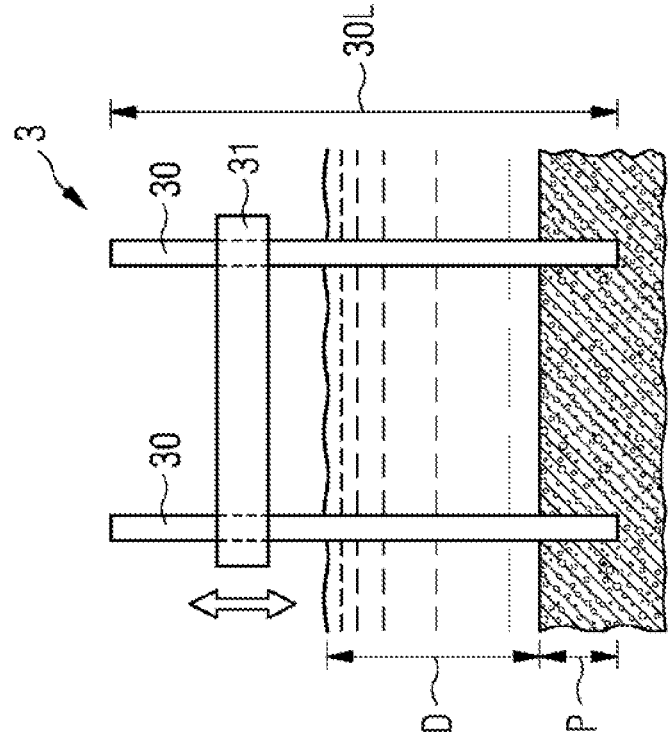
FIG. 7B shows a jackup vessel used during an installation procedure using an embodiment of the inventive lifting arrangement.

FIGS. 7A-7B show shows two instances of a jackup vessel 3 (also referred to as a "stationary" installation vessel). The jackup vessel is supported by four jackup legs 30 of a fixed length 30L determining a maximum recommended water depth D for the jackup vessel 3. A deck 31 of the jackup vessel 3 is self-elevating and moves along the jackup legs 30 as indicated by the vertical arrow. To ensure stability of the jackup vessel 3, the maximum recommended water depth (or rated water depth) D of the jackup vessel is significantly less than the length 30L of the jackup legs 30. The jackup legs 30 of installation vessels generally used in the installation of wind turbines or wind parks have a rated water depth D of up to 40 m. For the jackup vessel to be stable, the penetration P of the legs 30 must be sufficiently deep, for example up to 10 m. This is generally the case for water depths in the region of 30-40 m, where the seabed can be penetrated to such depths P.

In FIG. 7A, the jackup vessel 3 is being used in a water depth D that corresponds to the vessel's maximum recommended water depth. Its legs 30 can penetrate the seabed to the desired depth P, and the deck 31 of the jackup vessel 3 can be raised to a favourable height above sea-level. When being used under such satisfactory conditions, the jackup vessel 3 is able to resist any buffeting wave action and is essentially stationary, i.e. it does not exhibit any significant motion.

In FIG. 7B, the jackup vessel 3 is being used in a water depth DX that exceeds the vessel's maximum recommended water depth, e.g. in a water depth DX of 50 m or more, so that the legs 30 must be "over-extended" in order to raise the deck above sea-level. In this example, the legs 30 penetrate the seabed only to a depth PX that is not sufficient to anchor the jackup vessel 3 satisfactorily. These factors, in addition to the buffeting wave action on the legs 30, lead to instabilities of the installation vessel 3 which result in significant oscillations H3. Furthermore, the movements of a crane (not shown) may amplify the oscillations of the unstable jackup vessel 3, especially when the crane is being used to transfer a load to a very tall wind turbine tower. Any such movements of the jackup vessel 3 and the crane will manifest as oscillations of the load, making it difficult to align the load with a moving target as explained above. Such deep water conditions and tall wind turbine tower heights may become the norm in future. With the inventive lifting assembly, the movements of the load can be synchronized to the target motion. It will therefore be possible to use an available jackup vessel 3 out of its rated depth to install wind turbines in deep water locations, so that installation costs can be kept favourably low.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A lifting arrangement configured to facilitate alignment of a load with a wind turbine assembly, the lifting arrangement comprising:
   a crane arrangement for hoisting the load to the wind turbine assembly;
   a tagline arrangement for stabilizing the load during a lifting manoeuvre;
   a sensor arrangement configured to detect a motion of the wind turbine assembly relative to the load during the lifting manoeuvre;
   an actuator arrangement for adjusting a position of the load relative to the wind turbine assembly; and
   a control arrangement for controlling actuators of the actuator arrangement to reduce the motion of the wind turbine assembly relative to the load;
   wherein the sensor arrangement comprises a sensor arranged at an upper level of the wind turbine assembly, the sensor configured to detect an oscillation of the wind turbine assembly.

2. The lifting arrangement according to claim 1, wherein the control arrangement is configured to generate control signals for the actuators of the actuator arrangement to synchronize a motion of the load to the motion of the wind turbine assembly on a basis of data from one or more sensors.

3. The lifting arrangement according to claim 1, wherein the sensor arrangement comprises a sensor arranged on a lifting tool of the crane arrangement, the sensor configured to detect an oscillation of the load.

4. The lifting arrangement according to claim 1, wherein the crane arrangement is installed on an installation vessel and the sensor arrangement comprises a sensor arranged at a level of the installation vessel, the sensor configured to detect at least a motion of the wind turbine assembly.

5. The lifting arrangement according to claim 1, wherein an actuator of the actuator arrangement comprises a winch motor configured to adjust a tension of a tagline.

6. The lifting arrangement according to claim 1, wherein the actuator arrangement comprises an actuator configured to adjust an orientation of a suspended load, and wherein the control arrangement is configured to generate a control signal for the actuator.

7. The lifting arrangement according to claim 1, wherein the sensor arrangement comprises a plurality of accelerometers.

8. The lifting arrangement according to claim 1, wherein the sensor arrangement comprises a laser surface velocimeter arrangement.

9. The lifting arrangement according to claim 1, configured for the installation of an offshore wind turbine with a tower height of at least 70 m, and/or wherein an installation vessel supporting the crane arrangement is adapted for a water depth of at most 40 m.

10. A method of aligning a load with a wind turbine assembly, the method comprising:
   providing a crane arrangement for hoisting the load to the wind turbine assembly;
   providing a tagline arrangement for stabilizing the load during a lifting manoeuvre;
   providing a sensor arrangement configured to detect a motion of the wind turbine assembly relative to the load during the lifting manoeuvre;
   providing an actuator arrangement for adjusting a position of the load relative to the wind turbine assembly; and
   controlling actuators of the actuator arrangement to reduce the motion of the wind turbine assembly relative to the load;
   wherein the sensor arrangement comprises a sensor arranged at an upper level of the wind turbine assembly, the sensor configured to detect an oscillation of the wind turbine assembly.

11. The method according to claim 10, wherein the crane arrangement is provided on an installation vessel, and the method further comprises the step of positioning the installation vessel downstream of an offshore wind turbine assembly prior to the lifting manoeuvre.

12. The method according to claim 10, comprising the step of determining an initial position of the load on a basis of the motion of the wind turbine assembly relative to the load.

13. The method according to claim 10, wherein a horizontal displacement of the load is achieved by adjusting a tagline tension.

14. A computer program product, comprising a computer readable hardware storage device having computer readable program code stored therein, said program code executable by a processor of a computer system to implement a method according to claim 10.

* * * * *